United States Patent [19]

Borchardt

[11] Patent Number: 5,024,276
[45] Date of Patent: Jun. 18, 1991

[54] HYDRAULIC FRACTURING IN SUBTERRANEAN FORMATIONS

[75] Inventor: John K. Borchardt, Houston, Tex.

[73] Assignee: Shell Oil Company, Houston, Tex.

[21] Appl. No.: 442,265

[22] Filed: Nov. 28, 1989

[51] Int. Cl.$^5$ ............................................. E21B 43/267
[52] U.S. Cl. .................................. 166/308; 252/8.551
[58] Field of Search ............... 166/259, 271, 280, 308, 166/309; 252/8.551

[56] References Cited

U.S. PATENT DOCUMENTS

| | | | |
|---|---|---|---|
| 3,342,256 | 9/1967 | Bernard et al. | 166/9 |
| 3,369,601 | 2/1968 | Bond et al. | 166/9 |
| 3,710,861 | 1/1973 | Ver Steeg | 166/269 |
| 4,286,660 | 9/1981 | Wagner et al. | 166/246 |
| 4,380,266 | 4/1983 | Wellington | 166/252 |
| 4,445,573 | 5/1984 | McCaleb | 166/309 X |
| 4,528,106 | 7/1985 | Grolitzer | 252/8.554 |
| 4,569,394 | 2/1986 | Sweatman et al. | 166/309 X |
| 4,582,137 | 4/1986 | Schmitt | 166/270 |
| 4,683,074 | 7/1987 | Malik et al. | 252/136 |
| 4,688,639 | 8/1987 | Falk | 166/308 X |
| 4,706,752 | 11/1987 | Holm | 166/273 |
| 4,723,605 | 2/1988 | Sydansk | 166/308 X |
| 4,799,550 | 1/1989 | Harris et al. | 166/308 X |
| 4,856,588 | 8/1989 | Borchardt | 166/308 X |

OTHER PUBLICATIONS

Surfactants for $CO_2$ Foam Flooding, Borchardt et al., SPE 14394, 1985.
CT Studies of Surfactant-Induced $CO_2$ Mobility Control, Wellington et al., SPE 14393, 1985.

*Primary Examiner*—George A. Suchfield

[57] ABSTRACT

This invention provides a process for the hydraulic fracturing of a subterranean formation, which comprises introducing into the formation under fracturing pressure a fracturing fluid comprising solid particulate suspended in a fluid dispersion comprising water, a specified gaseous or supercritical component, and a surfactant component selected from a certain class of polysaccharide compounds. For purposes of this invention, the gaseous or supercritical carbon dioxide and gaseous nitrogen, carbon dioxide and $C_1$ to $C_3$ hydrocarbons, and mixtures thereof. The polysaccharide component comprises one or more surfactants of the formula $RO(R^1O)_x Sacc_z$, wherein R is a monovalent organic radical having a carbon number in the range from about 7 to 24, $R^1$ represents a divalent hydrocarbon radical containing from about 2 to about 4 carbon atoms, x is a number having an average value in the range from 0 to about 12.0, and $Sacc_z$ represents an average number z between about 0.7 and 10.0 of moieties derived from reducing saccharides containing 5 or 6 carbon atoms. R preferably represents an alkyl, alkylphenyl, hydroxyalkyl phenyl, or hydroxyalkyl moiety having a carbon number in the range from about 8 to about 20; the optional ($R^1O$) group is (when present) preferably an oxyethylene group; x is preferably between about 0 and 8.0, and is most preferably 0; Sacc preferably represents a glucose, galactose, glucosyl or galactosyl residue, and most preferably represents a glucose residue; and z is suitably between about 0.7 and 10.0, and is most preferably between about 1.3 and 4.0. Seawater and brines suitably serve as the source of the water. Dispersions formed from these three components are viscous foams which are highly stable under the conditions typically encountered in applications of hydraulic fracturing processes.

22 Claims, No Drawings

HYDRAULIC FRACTURING IN SUBTERRANEAN FORMATIONS

BACKGROUND OF THE INVENTION

This invention relates generally to a hydraulic fracturing process for a subterranean formation, which comprises introducing into the formation under pressure a fracturing fluid comprising solid particulate suspended in a fluid dispersion comprising water, a specified gaseous or supercritical component, and a surfactant component selected from a certain class of polysaccharide compounds. With respect to the formation of a three-component fluid dispersion, the invention is related to the process claimed in U.S. Pat. No. 4,856,588, issued Aug. 15, 1989, entitled "Selective Permeability Reduction of Oil-Free Zones of Subterranean Formations".

U.S. Pat. No. 4,856,588 describes and claims an improved process for the recovery of oil from a formation which has both zones of high oil saturation and zones substantially free of oil. That process involves the introduction into a substantially oil-free zone of a dispersion of water, a gaseous or supercritical component, and a polysaccharide surfactant. The dispersion selectively reduces the permeability of flow through these zones, without plugging high oil-saturation zones of the formation.

The present application describes and claims a closely-related process in which the same fluid dispersion, together with suspended solid particulate, is injected into a subterranean formation for purposes of hydraulic fracturing.

Hydraulic fracturing is a well known process wherein the permeability of a subterranean formation is increased by generating high permeability cracks in the formation rock. Particulate (commonly sand) suspensions are injected at sufficiently high rates and pressures to generate these cracks, called fractures, in the rock. The fractures are held open by the particulate, called proppant. The fractures increase the permeability of the formation for the flow of oil and gas, and thus enhance its recovery.

Although it is more common to use a fracturing fluid which is a solution of crosslinked polymer in water, the use of surfactant foams in hydraulic fracturing has been known for several years, particularly in applications to low pressure formations and in water-sensitive formations. Surfactant foams are known to have advantages in combining a relatively low viscosity with good proppant suspension and transport capabilities. It is also recognized that the foams carry a minimal amount of liquid phase in the formation. Still further, foams do not suffer, at least to the same extent as aqueous fluids, from problems such as permeability damage to the formation which may result as liquids leak off from the fracture into the formation.

In one important aspect, the present invention utilizes as the surfactant component of the fracturing fluid one or more of certain polysaccharide compounds. These polysaccharides are nonionic surfactants which are generally known for use as components of laundry detergents, personal cleaning products, dishwashing formulations, fire fighting foams, ore mining and treatment solutions, etc. Suggestions have been made in the prior art for use of alkyl polysaccharides, and particularly alkylglycosides, as a component of well drilling fluids, that is, the fluids circulated down a well bore during drilling to cool the drill bit and suspend and carry rock cuttings to the surface. U.S. Pat. No. 4,683,074 has recently described the use of particularly defined mixtures of monoglycoside and polyglycoside surfactants in acid containing compositions intended for use in metal and porcelain cleaner formulations and in formulations for oil well acidizing and acid fracturing. Acid fracturing and acidizing processes operate under different mechanisms than hydraulic fracturing processes. Acidizing processes use a strongly acidic composition to dissolve rock or etch channels into the rock in a subterranean formation to enhance its permeability. The process of U.S. Pat. No. 4,683,074 employs polysaccharide surfactants because of their excellent stability to highly acid conditions. The patent mentions an acidizing foam, but does not identify its composition or properties. As is recognized in the art (e.g., the text *Reservoir Stimulation*, H. J. E. Economides and K. G. Nolte, Schlumutilize neutral to mildly basic fluids and are readily distinguishable from acidizing processes.

SUMMARY OF THE INVENTION

The present invention relates to the extension of discoveries relating to the mobility control characteristics of polysaccharide surfactant containing dispersions or foams, as described in U.S. Pat. No. 4,856,588, to applications of the surfactant dispersions to processes for the hydraulic fracturing of subterranean formations. For purposes of this invention, polysaccharide surfactant compositions, having a solid particulate suspended in a dispersion comprising water, a specified gas or supercritical fluid, and the polysaccharide component, are introduced into the formation under a pressure sufficient to accomplish fracturing within the formation.

Accordingly, the invention can be briefly described as a process for the hydraulic fracturing of subterranean formations which comprises a step for the introduction into the formation under a pressure sufficient to fracture the formation a fracturing fluid comprising solid particulate suspended in a fluid dispersion comprising (a) water, (b) a component selected from the group consisting of supercritical carbon dioxide and gaseous nitrogen, carbon dioxide and $C_1$ to $C_3$ hydrocarbons, and mixtures thereof, and (c) one or more polysaccharide surfactants of the formula $RO(R^1O)_x Sacc_z$, wherein R is a monovalent organic radical having a carbon number in the range from about 7 to 24. $R^1$ represents a divalent hydrocarbon radical containing from about 2 to about 4 carbon atoms, x is a number having an average value in the range from 0 to about 12.0, and $Sacc_z$ represents an average number z between about 0.7 and 10.0 of moieties derived from reducing saccharides containing 5 or 6 carbon atoms. R preferably represents an alkyl, alkylphenyl, hydroxyalkyl phenyl, or hydroxyalkyl moiety having a carbon number in the range from about 8 to about 20; the optional ($R^1O$) group is (when present) preferably an oxyethylene group; x is preferably between about 0 and 8.0, and is most preferably 0; Sacc preferably represents a glucose, galactose, glucosyl or galactosyl residue, and most preferably represents a glucose residue; and z is suitably between about 0.7 and 10.0, and is most preferably between about 1.3 and 4.0.

Relative to other nonionic surfactants, such as alcohol ethoxylates and alkylphenol ethoxylates, the polysaccharide surfactants are soluble and foam well in saline waters. This property is particularly valuable for application of the invention to formations in certain areas (e.g., west and south Texas, Kansas, the Appalachian Basin and offshore) where brines are the principal source of water used in such treatment processes. Furthermore, unlike the alcohol ethoxylates and alkylphenol ethoxylates, the polysaccharide surfactants specified for use in this invention do not exhibit the cloud point phenomenon, i.e., formation of a separate opaque surfactant-rich phase, when surfactant solution temperature is increased. Still further, the polysaccharides are substantially more soluble in the presence of divalent metal salts, such as calcium and magnesium salts, in comparison to both the other nonionic surfactants and many common anionic surfactants, such as the petroleum sulfonates. Unlike the anionic surfactants, the polysaccharide surfactants are compatible with quaternary ammonium salt polymers frequently used as formation damage control additives in hydraulic fracturing fluids.

As noted in U.S. Pat. No. 4,856,588, dispersions such as are formed for purposes of this invention from water, gas or supercritical fluid, and polysaccharide surfactant are very sensitive to the presence of oil. Stable, viscous dispersions are formed and maintained only in an environment essentially oil-free. This sensitivity is not a drawback in the hydraulic fracturing process, since the oil concentration within the generated fracture is extremely low. When the fracturing process is complete, this sensitivity enhances the rate at which oil flows into and through the fractures which have been created.

DESCRIPTION OF THE PREFERRED EMBODIMENTS

The present invention can generally be applied to treatment of any subterranean formation wherein hydraulic fracturing would be desired. Generally, the invention is expected to find its principal utility in application to oil- and/or gas-containing formations.

The hydraulic fracturing function of this invention is provided by injecting into the formation a fracturing fluid comprising solid particulate suspended in a foam-forming mixture comprising (a) water, (b) a component selected from the group consisting of supercritical carbon dioxide and gaseous carbon dioxide, nitrogen and $C_1$ to $C_3$ hydrocarbons, and mixtures thereof, and (c) one or more of certain polysaccharide surfactants.

One major component of the fracturing fluid is water. Very suitably the necessary water may be provided either in relatively pure form or as a solution containing significant amounts of salts, e.g., alkali metal and/or alkaline earth metal salts. In this respect, it is suitable to use seawater and/or brines co-produced from the formation as the source of the water. The tolerance of the fluid dispersion on which the fracturing fluid is based to the presence of salts is considered a surprising aspect of the invention, particularly the salt tolerance of the dispersion under the elevated temperature conditions often encountered in deep oil-containing formations. The specified polysaccharide surfactant component is unique among nonionic surfactants in terms of its solubility in water and brines at the elevated temperature often encountered in the formation.

Component (b) of the composition is suitably one or a mixture of materials selected from the group consisting of (i) supercritical carbon dioxide, (ii) gaseous carbon dioxide, (iii) gaseous nitrogen, and (iv) gaseous hydrocarbons having carbon numbers in the range from 1 to 3, inclusive. It shall be understood that carbon dioxide may suitably be present in the mixture in either the gaseous or supercritical state (at conditions within the formation). Nitrogen and the $C_1$ to $C_3$ hydrocarbons are necessarily in the gas state. Preferably, this component is selected from the group consisting of carbon dioxide (either gaseous or supercritical) and nitrogen, while the use of carbon dioxide is considered most preferred.

Selection between nitrogen, carbon dioxide and $C_1$-$C_3$ hydrocarbons will, in some instances, be determined by the conditions under which the invention is to be applied to fracturing in a particular reservoir. Thus, for example, $C_2$ and $C_3$ hydrocarbons would be inappropriate in high pressure, low temperature applications at which they would be in the liquid state.

In general, the polysaccharide surfactant component (c) suitable for use in the invention can be one or a mixture of compounds represented by the formula $RO(R^1O)_x Sacc_z$. The hydrophobic R substituent in this formula represents a mono-valent organic radical having a carbon number in the range from about 7 to 24. Preferred for use in the practice of the invention are polysaccharides wherein the hydrophobic R group of the molecule is an alkyl, alkylphenyl, hydroxyalkyl phenyl, or hydroxyalkyl group. Preference can also be expressed for R substituents having carbon numbers in the range from about 8 to 20, while an R group in the $C_9$ to $C_{16}$ range is more preferred and an R group in the $C_{12}$ to $C_{16}$ range is considered most preferred. In the case of hydroxyalkyl and hydroxyalkylphenyl groups, R may contain up to about 3 hydroxy groups. The R group may have a branched-chain structure, but is preferably of linear carbon chain structure. It is often the case that commercially prepared polysaccharide products are comprised of mixtures of molecules characterized by R groups within a range of carbon numbers and having different structures. Such mixtures are very suitable for purposes of this invention.

The $R^1$ divalent hydrocarbon radical suitably has a carbon number in the range of from about 2 to 4. Preferably, each ($R^1O$) unit represents an oxyethylene or oxypropylene radical, and is most preferably an oxyethylene radical. The $(R^1O)_x$ moiety is an optional substituent of the surfactant molecule which may be present as a link between the hydrophobic R moiety and the hydrophylic polysaccharide moiety. The number x of oxyalkylene substituents, which typically represents an average of a range of individual integer values, is suitably between about 0 and 12.0, and is preferably 0. When x is not 0, it is preferably between about 2.5 and 8.0, and more preferably between about 2.5 and 5.0.

The polysaccharides are typically prepared as mixtures of molecules having different numbers of added hydrophilic saccharide units, i.e., different values of z in the above formula. For this reason, the number of saccharide units in the product molecules is best expressed as an average value. Preference can be stated for use in this invention of polysaccharides having an average number of saccharide units in the range from about 0.7 to 10.0, while an average number of saccharide units per molecule which is in the range from about 1.0 to 6.0 is considered more preferred and an average number of saccharide units per molecule which is in the range from about 1.3 to 4.0 is considered most preferred.

The saccharide unit Sacc is derived from a reducing saccharide containing 5 or 6 carbon atoms. For example, each Sacc may be a glucoside, galactoside, fructoside, glucosyl, galactosyl, or fructosyl group. Preferably, Sacc is a glucose, galactose, glucosyl, galactosyl residue; more preferably Sacc represents a glucose residue.

Polysaccharide surfactants useful in this invention also include those in which one or more of the normally free (i.e., unreacted) hydroxyl groups of a saccharide moiety Sacc have been alkoxylated, resulting in one or more pendant alkoxy or polyalkoxy groups in place of the hydroxyl group(s). Preferably, the added alkoxy or polyalkoxy groups are oxyethylene or oxypropylene groups, or mixed oxyethylene/oxypropylene groups. The surfactant may suitably contain an average of from 0 to about 20 mols (preferably 0 to 10 mols) of such pendant oxyalkylene units per mole of saccharide moiety Sacc (i.e., per unit value of z).

A particularly preferred group of polysaccharide surfactants suitable for use in this invention includes those of the above formula for which R is a an alkyl or alkylphenyl radical having from about 9 to 15 carbon atoms, x is zero, Sacc is glucose, and z is a number having an average value of from about 1.3 to 4.0.

Polysaccharides are conventional materials, which can be prepared by methods well known in the art. Polysaccharides wherein the Sacc moiety is characterized by pendant oxyalkylene chains are described in U.S. Pat. No. 4,528,106.

The polysaccharide surfactant component is generally applied in a quantity of at least about 0.05% w (percent by weight), calculated on water. As a general rule, it is preferable for the surfactant concentration as applied in the concentration range from about 0.1 to about 2% w (calculated on the combined weight of water plus polysaccharide) although compositions within a broader range of surfactant content, for instance, 0.05% w to 5.0% w are also considered suitable. The composition more preferably has a surfactant concentration between about 0.25 and 0.75% w and most preferably a concentration of about 0.5% w.

The gas component is suitably applied such a quantity that the resulting three-component mixture forms a dispersion (or foam, as that term is commonly applied). The relative quantities of gas or supercritical fluid component and aqueous phase are not narrowly critical to the invention. Preferably, however, the composition used in the invention is characterized by a volume ratio (at injection conditions) of the gas or supercritical fluid component to the liquid water and surfactant mixture which in the range of from about 0.1:1 to 100:1, more preferably in the range from about 0.5:1 to 10:1 and is most preferably in the range from about 1:1 to 5:1.

The solid particulate which is suspended in this dispersion to form the desired fracturing fluid is most commonly sand, but can also be any one or a mixture of other particulate materials which are chemically inert to the components of the fluid and the formation and having the physical characteristics known to be required of fracturing fluid proppants (e.g., particle size, shape, hardness). Examples of other common particulate materials used for this purpose include glass beads, sintered bauxite, alumina, and resin (e.g., epoxy or phenol-formaldehyde resin) coated sand. The optimum particle size (average diameter) and particle size distribution are determined by formation permeability characteristics.

For purposes of practicing the invention, the suspension of particulate material in the dispersion is introduced into the formation, typically by injection through a production well. Most advantageously, the three component dispersion is formed, with subsequent addition thereto and suspension therein of the particulate matter. However, the order of the mixing of the several components is not critical to the invention.

The particulate is typically applied in the fluid in a quantity in the range of about 30–4000 lb. per calculated 1000 square feet of propped fracture, preferably 100–500 lb. per 1000 square feet and most preferably 100–300 lb. per 1000 square feet. The optimum amount of particulate is influenced by such variables as formation permeability, particulate particle size rock confining pressure and rock hardness.

In addition to the particulate suspended in the three component dispersion, the fracturing fluid may suitably comprise additional ingredients which are compatible with the desired foam properties of the mixture and do not adversely influence the solubility of the polysaccharide surfactant in the aqueous phase.

In certain preferred embodiments, the fracturing fluid consists essentially of the four specified components and optionally further contains limited amounts of other ingredients, such as, for instance, additives which have been proposed for use in other foam fracturing processes. Suitable optional additives for use in the fracturing fluid applied in the process of the invention include foam stabilizing agents, clay stabilizing agents (such as potassium chloride or quaternary ammonium salts in an amount up to 5% w), pH buffering agents, bactericides, friction reducers, foam stabilizing agents, and fluid loss prevention agents. Examples of foam stabilizing agents include additives such as guar, hydroxypropyl guar, carboxymethylhydroxypropyl guar, hydroxyethyl cellulose, carboxymethylhydroxyethyl cellulose, xanthan gum, water-soluble biopolymers such as scleroglycan, and the like, in quantities up to about 1% w. Fluid loss prevention agents are exemplified by silica flour which is often of a carefully selected particle size in the range from about 10 to 40 microns in diameter but which can more generally be in the range from about 1 to 75 microns depending on formation pore size. In conventional practice, such fluid loss agents are applied in amounts of about 10–50 pounds per 1,000 gallons of liquid phase. Somewhat lesser amounts, i.e., up to 20 pounds per 1,000 gallons water in the fluid, are considered preferred for use in this invention. Bactericides (also called biocides) are used to prevent bacterial degradation of the fluid components, e.g., the surfactant or the waterthickening polymer. Typical use levels are in the range of 1 to 10 gallons per 1000 gallons of water. Common examples include glutaraldehyde, isothiazolines, chlorophenates, dithiocarbamates, and quaternary amines. Common friction reducers are water-soluble polymers having a molecular weight under 1,000,000 daltons. Examples include polyacrylamide and acrylamide copolymers with one of the following comonomers: 2-acrylamidomethymethypropane sulfonic acid sodium salt, dimethylaminoethylmethacrylate and sodium acrylate.

In other preferred embodiments, the fracturing fluid consists only of the four specified ingredients in the relative amounts indicated.

The specified three components from which the fluid dispersion is formed for purposes of the invention have been found to be incapable of supporting the formation of a viscous, stable dispersion in the presence of a significant quantity of oil. For this reason, the fracturing fluid used in this invention is necessarily essentially free of oil.

The invention can very suitably be applied to a substantially oil-free formation, e.g., to the fracturing of a natural gas reservoir. However, the invention need not be limited in its application to oil-free reservoirs. For instance, the invention is very suitably applied to formations having relatively high oil saturation. Under the high pressure at which the fracturing fluid is injected into the formation for purposes of this invention, little if any oil is drawn from the formation rock into the fracturing channel. The interaction of the fracturing fluid with the surfaces of oil-containing rock over the duration of the fracturing process does not meaningfully interfere with the capability of the bulk fluid to maintain a stable, viscous dispersion.

In one respect, the sensitivity of the polysaccharide foam to the presence of free oil is of particular benefit to the process of this invention. The purpose of a fracturing process in an oil containing formation (to create channels which facilitate the flow of oil through and its recovery from the formation rock) would be defeated if, at the completion of the process, natural flow channels and pores in the formation are blocked by a viscous fracturing fluid. For this reason, relatively rapid breakdown of the fracturing dispersion or foam within the rock matrix is desirable. In the practice of the present invention, breakdown of the dispersion or foam is directly associated with the presence of oil available for flow into the fracture and to the production well bore. The greater the quantity of oil in contact with the dispersion in a given natural flow channel, the more rapid is the breakdown of the dispersion in that channel. The lower the viscosity of the fluid in the rock matrix, the more rapidly that fluid flows into the fracture and to the well bore, and thus the more rapidly oil production begins.

As observed hereinabove, it is also necessary that the fracturing fluid be non-acidic (i.e., of neutral or basic pH).

Injection of the fracturing fluid into the formation for purposes of this invention is suitably accomplished using equipment and procedures known in the art for hydraulic fracturing processes. The composition is typically injected at ambient temperature and at a pressure of up to about 20,000 psig. Injection pressure is necessarily sufficient to create the desired fractures in the formation. Determinations of the most appropriate injection pressures for applications of the invention to different formations are suitably made according to factors well recognized in the hydraulic fracturing art.

The invention is further illustrated through reference to the following Examples and Comparative Experiments. The Examples describe certain preferred aspects of the invention, and are not intended to restrict its broader scope.

Each of the following Examples utilizes a standard test procedure to evaluate the capabilities of mixtures of water, polyglycoside surfactant and gas in the production of the stable viscous dispersions desired for purposes of this invention. The test simulates the ability of the composition to establish and maintain a stable viscous foam. (J. K. Borchardt et al, "Surfactants for $CO_2$ Foam Flooding," Paper No. SPE 14394 and S. L. Wellington et al, "CT Studies of Surfactant-Induced Mobility Control," Paper No. SPE 14393, both presented at the Sixtieth Annual Technical Conference of the Society of Petroleum Engineers of AIME, Sept. 22-25, 1985.) For each test, 10 cc of a 0.5% w aqueous brine solution of a selected polysaccharide surfactant were placed in a clean tared graduated cylinder. The headspace was flushed with $CO_2$ to remove air. The tube was sealed, shaken for thorough mixing, and then placed in a water bath and allowed to equilibrate at a selected test temperature. After equilibration, the samples were then shaken again (in a controlled, reproducible manner) and foam volume determined (and reported in terms of cc volume) as a function of time.

EXAMPLE 1

Four samples of polysaccharide surfactants were screened in aqueous brine/$CO_2$ dispersions, using the standard test procedure.

For purposes of these tests, the brine contained 10.55% w sodium chloride, 1.84% w calcium chloride hydrate, and 0.28% w magnesium chloride hydrate. Tests were performed at room temperature (23° C.).

The polysaccharide surfactants used in the four tests (designated a, b, c and d, respectively) are characterized as follows:

a. a mixture of molecules having substantially linear alkyl R groups in the $C_9$ to $C_{11}$ range and an average of one glycoside group per molecule, b. a mixture of molecules having substantially linear alkyl R groups in the $C_9$ to $C_{11}$ range and an average of three glycoside groups per molecule;

c. a mixture of molecules having substantially linear alkyl R groups in the $C_{12}$ to $C_{13}$ range and an average of one glycoside group per molecule;

d. a mixture of molecules having substantially linear alkyl R groups in the $C_{12}$ to $C_{13}$ range and an average of three glycoside groups per molecule.

Foam volumes were measured over time to determine their stability. The results, presented in Table 1, show that compositions according to this invention are capable of forming and maintaining the desired foaming dispersions over significant periods of time.

TABLE 1

| surfactant | foam volume after | | | |
| --- | --- | --- | --- | --- |
| | 1 min | 4 min. | 10 min. | 15 min. |
| a | 20.5 | 19.2 | 18.6 | 17.0 |
| b | 21.5 | 20.4 | 19.3 | 18.7 |
| c | 12.0 | 10.3 | 10.0 | 9.9 |
| d | 19.6 | 17.6 | 16.9 | 16.7 |

EXAMPLE 2

This example illustrates the selectivity of the polysaccharide surfactant compositions for stable dispersion formation only in aqueous media substantially free of oil. Compositions containing the four surfactants described in Example 1 were screened in tests carried out in the same aqueous brine, to which had been added either 30%v of decane ("D") or 30% v of a 1:1 by volume mixture of decane and toluene ("D/T"). The decane or decane/toluene mixture served as models for crude oils. Other than with respect to the initial addition of the decane and toluene to the cylinder, the tests were carried out using the procedures described in Example 1.

The results for these tests, presented in Table 2, show that the surfactants do not form stable dispersions in the presence of the added hydrocarbons. The data from the tests of Example 1 (no oil phase) are included in Table 2 for comparison. The selectivity of the polysaccharide properties in the media free of oil is evident from this comparison, both in initial foam volume and in stability over time.

TABLE 2

| surfactant | oil phase | foam volume after | | | |
|---|---|---|---|---|---|
| | | 1 min. | 5 min. | 10 min. | 15 min. |
| a | none | 20.5 | 19.2 | 18.6 | 17.0 |
| a | D | 10.8 | 6.2 | 2.4 | 0 |
| a | D/T | 7.4 | 1.1 | 0.9 | 0 |
| b | none | 21.5 | 20.4 | 19.3 | 18.7 |
| b | D | 14.6 | 12.8 | 11.7 | 8.0 |
| b | D/T | 11.6 | 9.0 | 6.0 | 4.5 |
| c | none | 12.0 | 10.3 | 10.0 | 9.9 |
| c | D | 0 | 0 | 0 | 0 |
| c | D/T | 0 | 0 | 0 | 0 |
| d | none | 19.6 | 17.6 | 16.9 | 16.7 |
| d | D | 7.8 | 7.3 | 7.2 | 5.0 |
| d | D/T | 7.8 | 7.0 | 6.8 | 3.4 |

EXAMPLE 3

Evaluations were made of the four compositions tested in Examples 1 and 2 at a temperature of 75° C. The tests of this Example were otherwise carried out under the same procedures as those described above, both in aqueous media and in media containing decane or decane and toluene.

The results, presented in Table 3, again illustrate the capabilities of the polysaccharide surfactants for forming and maintaining stable, viscous dispersions in a medium substantially free of oil.

TABLE 3

| surfactant | oil phase | foam volume after | | |
|---|---|---|---|---|
| | | 1 min. | 5 mon. | 10 min. |
| a | none | >23.4 | 4.4 | 1.2 |
| a | D | 2.5 | 0.2 | 0 |
| a | D/T | 0 | 0 | 0 |
| b | none | >23.6 | 18.0 | 10.9 |
| b | D | 15.6 | 5.0 | 2.4 |
| b | D/T | 0.6 | 0 | 0 |
| c | none | 8.6 | 7.8 | 7.6 |
| c | D | 0 | 0 | 0 |
| c | D/T | 0 | 0 | 0 |
| d | none | >23.8 | 21.0 | 19.9 |
| d | D | 8.0 | 2.3 | 1.9 |
| d | D/T | 0.6 | 0 | 0 |

EXAMPLE 4

This example indicates that polysaccharide surfactants are chemically stable in brine solution at elevated temperature.

The surfactant/brine solutions evaluated in the tests of Example were stored at a temperature of 75° C. for a period of 29 days. The pH of the solutions was 3. Foam generation and stability for these samples was evaluated at 75° C. after 1, 10 and 29 days of storage. The results are presented in Table 4.

TABLE 4

| surfactant | oil phase | 10 minute foam volume after storage for | | |
|---|---|---|---|---|
| | | 1 day | 10 days | 29 days |
| a | none | 1.2 | 4.4 | 7.0 |
| a | D | 0 | 0.4 | 0 |
| a | D/T | 0 | 0 | 0 |
| b | none | 10.9 | 11.6 | 19.0 |
| b | D | 2.4 | 3.1 | 3.1 |
| b | D/T | 0 | 0 | 0 |
| c | none | 7.6 | 7.6 | 6.3 |
| c | D | 0 | 0 | 0 |
| c | D/T | 0 | 0 | 0 |
| d | none | 19.9 | 20.5 | 19.0 |
| d | D | 1.9 | 1.7 | 1.4 |

TABLE 4-continued

| surfactant | oil phase | 10 minute foam volume after storage for | | |
|---|---|---|---|---|
| | | 1 day | 10 days | 29 days |
| d | D/T | 0 | 0 | 0 |

The stability of the polysaccharide molecules, in the presence of low pH brine and at elevated temperature, is considered particularly surprising, in view of the known hydrolytic instability of the molecules' acetal linkages.

COMPARATIVE EXPERIMENT A

For comparison, evaluations were carried out on compositions containing alkyl polyoxyethylene (i.e., alcohol ethoxylate) surfactants. Like the alkyl polysaccharides, these alkyl polyoxyethylene surfactants are nonionic surfactants. However, they are not suitable for use in this invention.

Tests at 75° C. were run on a series of four alkyl polyoxyethylene surfactants (designated e, f, g and h, respectively) which are characterized as follows:

e. a mixture of molecules having substantially linear alkyl groups in the $C_9$ to $C_{11}$ range and an average of eight oxyethylene groups per molecule, f. a mixture of molecules having substantially linear alkyl groups in the $C_9$ to $C_{11}$ range and an average of twelve oxyethylene groups per molecule;

g. a mixture of molecules having substantially linear alkyl groups in the $C_{12}$ to $C_{15}$ range and an average of seven oxyethylene groups per molecule, h. a mixture of molecules having substantially linear alkyl groups in the $C_{12}$ to $C_{15}$ range and an average of eighteen oxyethylene groups per molecule.

The results of these tests of the alkyl polyoxyethylene surfactants are presented in Table 5.

TABLE 5

| surfactant | oil phase | foam volume after 10 min. |
|---|---|---|
| e | none | 0 |
| e | D | 0 |
| e | D/T | 0 |
| f | none | 0.4 |
| f | D | 0.9 |
| f | D/T | 0 |
| g | none | 0 |
| g | D | 0 |
| g | D/T | 0 |
| h | none | 0.8 |
| h | D | 0.8 |
| h | D/T | 0 |

EXAMPLE 6

A further series of evaluations was made of the properties of polysaccharide surfactant dispersions over a range of temperatures and brine salt concentrations. Comparative evaluations were also made of alkyl polyoxyethylene surfactants and alkylphenol polyoxyethylene (i.e., alkylphenol ethoxylate) surfactants. The alkyl polysaccharide surfactants evaluated in this Example are characterized in Example 1. The alkyl polyoxyethylene surfactants evaluated are characterized as follows:

i. a mixture of molecules having substantially linear alkyl groups in the $C_9$ to $C_{11}$ range and an average of eight oxyethylene groups per molecule;

j. a mixture of molecules having substantially linear alkyl groups in the $C_{12}$ to $C_{15}$ range and an average of nine oxyethylene groups per molecule;

k. a mixture of molecules having substantially linear alkyl groups in the $C_{14}$ to $C_{15}$ range and an average of thirteen oxyethylene groups per molecule.

The alkylphenol polyoxyethylene surfactants evaluated are characterized as follows:

l. the product of the addition of an average of 9 oxyethylene groups to octyl phenol;

m. the product of the addition of an average of 9 oxyethylene groups to nonyl phenol.

These evaluations were made in oil-free brine solutions having a range of salinities. Solutions having a "relative salinity" of contained 9% w sodium chloride and 1% w calcium chloride. Solutions having a relative salinity of 0.5 contained 4.5% w sodium chloride and 0.5% w calcium chloride. Solutions having a relative salinity of 1.5 contained 13.5% w sodium chloride and 1.5% w calcium chloride.

The results of these tests, presented in Table 6, show that the alkyl polysaccharide surfactant dispersions exhibit the desired properties over a range of temperatures ("T") and relative salinities ("RS"). In contrast, the other, comparative, nonionic surfactant compositions tested offer relatively poor performance, particularly at the higher temperatures and relative salinities.

TABLE 6

| surfactant | T (°C.) | RS | foam volume after (min.) | | | | |
|---|---|---|---|---|---|---|---|
| | | | 1 | 5 | 10 | 30 | 60 |
| a | 25 | 0.5 | 16.0 | 14.3 | 14.2 | 7.8 | 5.2 |
| a | " | 1.0 | 15.0 | 13.2 | 12.0 | 8.9 | 4.6 |
| a | " | 1.5 | 11.0 | 9.0 | 7.7 | 6.3 | 5.7 |
| b | " | 0.5 | >23.8 | >22.6 | >22.4 | >22.4 | 20.2 |
| b | " | 1.0 | >22.2 | 21.4 | 19.8 | 19.8 | 19.3 |
| b | " | 1.5 | >21.2 | 19.4 | 18.8 | 18.8 | 18.2 |
| c | " | 0.5 | 13.8 | 13.2 | 12.8 | 12.0 | 11.0 |
| c | " | 1.0 | 13.8 | 11.6 | 10.6 | 10.3 | 10.0 |
| c | " | 1.5 | 11.0 | 10.0 | 9.0 | 8.8 | 8.4 |
| d | " | 0.5 | 18.6 | 17.4 | 17.0 | 15.8 | 15.8 |
| d | " | 1.0 | 17.6 | 16.6 | 15.6 | 15.2 | 15.0 |
| d | " | 1.5 | 15.4 | 14.6 | 14.6 | 14.2 | 14.2 |
| i | " | 0.5 | 21.4 | 6.4 | 4.3 | 1.0 | — |
| i | " | 1.0 | >23.0 | 3.2 | 2.0 | 0.4 | — |
| i | " | 1.5 | 21.0 | 1.2 | 0.8 | 0.0 | — |
| j | " | 0.5 | 23.2 | 4.0 | 2.0 | 1.0 | — |
| j | " | 1.0 | >23.2 | 13.0 | 5.0 | 2.4 | — |
| j | " | 1.5 | 21.0 | 1.2 | 0.8 | 0.0 | — |
| k | " | 0.5 | >22.2 | >22.1 | >21.0 | >21.0 | 6.0 |
| k | " | 1.0 | 20.8 | 17.6 | 7.2 | 1.2 | 1.0 |
| k | " | 1.5 | 16.4 | 16.0 | 13.4 | 3.2 | 1.9 |
| l | " | 0.5 | 21.2 | 7.4 | 4.4 | 2.2 | — |
| l | " | 1.0 | 20.4 | 19.8 | 5.0 | 1.2 | — |
| l | " | 1.5 | 15.8 | 10.8 | 3.8 | 1.0 | — |
| m | " | 0.5 | >22.4 | 10.2 | 2.6 | 0.5 | — |
| m | " | 1.0 | 15.4 | 10.2 | 5.0 | 1.4 | — |
| m | " | 1.5 | 10.2 | 9.2 | 6.4 | 5.4 | — |
| a | 40 | 0.5 | 16.6 | 14.6 | 11.6 | 4.0 | 1.4 |
| a | " | 1.0 | 13.2 | 11.4 | 9.6 | 5.6 | 1.8 |
| a | " | 1.5 | 9.2 | 6.5 | 5.2 | 4.6 | 4.2 |
| b | " | 0.5 | >23.8 | >22.5 | >22.3 | 14.0 | 13.6 |
| b | " | 1.0 | >23.8 | >22.5 | >22.4 | 7.3 | 9.2 |
| b | " | 1.5 | >22.8 | >21.4 | 19.8 | 19.2 | 9.2 |
| c | " | 0.5 | 15.6 | 14.4 | 13.9 | 13.6 | 13.2 |
| c | " | 1.0 | 14.8 | 12.5 | 11.4 | 10.2 | 9.0 |
| c | " | 1.5 | 14.2 | 11.6 | 11.0 | 10.0 | 9.2 |
| d | " | 0.5 | >24.0 | >22.2 | >22.2 | >22.2 | 21.0 |
| d | " | 1.0 | >24.0 | 19.0 | 18.8 | 18.6 | 18.4 |
| d | " | 1.5 | 18.0 | 17.2 | 16.4 | 16.4 | 16.2 |
| i | " | 0.5 | >23.4 | 2.2 | 1.8 | 0.0 | — |
| i | " | 1.0 | >23.4 | 1.2 | 0.6 | 0.0 | — |
| i | " | 1.5 | 20.4 | 1.0 | 0.4 | 0.0 | — |
| j | 40 | 0.5 | 18.4 | 4.2 | 1.3 | 0.4 | — |
| j | " | 1.0 | 18.0 | 4.6 | 1.8 | 0.4 | — |
| j | " | 1.5 | 11.8 | 4.4 | 1.6 | 0.0 | — |
| k | " | 0.5 | >23.2 | 11.8 | 5.6 | 3.0 | — |

TABLE 6-continued

| surfactant | T (°C.) | RS | foam volume after (min.) | | | | |
|---|---|---|---|---|---|---|---|
| | | | 1 | 5 | 10 | 30 | 60 |
| k | " | 1.0 | >21.4 | 7.2 | 2.4 | 0.9 | — |
| k | " | 1.5 | 18.2 | 17.4 | 3.8 | 0.6 | — |
| l | " | 0.5 | 22.0 | 5.0 | 2.2 | 0.0 | — |
| l | " | 1.0 | 19.2 | 3.4 | 2.0 | 0.0 | — |
| l | " | 1.5 | 10.8 | 6.2 | 4.7 | 0.6 | — |
| m | " | 0.5 | >21.2 | 1.8 | 0.6 | 0.0 | — |
| m | " | 1.0 | 7.4 | 7.0 | 2.0 | 0.3 | — |
| m | " | 1.5 | 5.4 | 2.4 | 2.0 | 1.2 | — |
| a | 75 | 0.5 | 13.0 | 2.8 | 1.6 | 0.0 | 0.0 |
| a | " | 1.0 | 10.6 | 5.2 | 2.8 | 0.0 | 0.0 |
| a | " | 1.5 | 7.6 | 6.4 | 5.6 | 3.6 | 0.0 |
| b | " | 0.5 | >22.8 | 1.4 | 0.8 | 0.0 | 0.0 |
| b | " | 1.0 | >22.8 | 2.2 | 1.0 | 0.0 | 0.0 |
| b | " | 1.5 | >22.8 | 3.0 | 1.6 | 0.0 | 0.0 |
| c | " | 0.5 | 7.4 | 6.2 | 6.2 | 6.0 | 6.0 |
| c | " | 1.0 | 7.4 | 6.0 | 5.6 | 5.4 | 5.0 |
| c | " | 1.5 | 7.4 | 6.6 | 6.6 | 5.8 | 4.8 |
| d | " | 0.5 | >22.8 | >22.2 | 17.2 | 14.0 | 1.8 |
| d | " | 1.0 | >22.8 | >22.2 | 17.0 | 14.4 | 2.4 |
| d | " | 1.5 | 15.4 | 15.0 | 14.0 | 9.6 | 7.4 |
| i | " | 0.5 | 1.6 | 0.0 | 0.0 | 0.0 | — |
| i | " | 1.0 | 0.0 | 0.0 | 0.0 | 0.0 | — |
| i | " | 1.5 | 0.0 | 0.0 | 0.0 | 0.0 | — |
| j | " | 0.5 | 2.2 | 0.8 | 0.0 | 0.0 | — |
| j | " | 1.0 | 1.0 | 1.0 | 0.0 | 0.0 | — |
| j | " | 1.5 | 0.0 | 0.0 | 0.0 | 0.0 | — |
| k | " | 0.5 | 1.5 | 0.0 | 0.0 | 0.0 | — |
| k | " | 1.0 | 3.6 | 0.0 | 0.0 | 0.0 | — |
| k | " | 1.5 | 0.0 | 0.0 | 0.0 | 0.0 | — |
| l | " | 0.5 | 0.0 | 0.0 | 0.0 | 0.0 | — |
| l | " | 1.0 | 1.0 | 0.0 | 0.0 | 0.0 | — |
| l | " | 1.5 | 0.0 | 0.0 | 0.0 | 0.0 | — |

I claim as my invention:

1. A process for the hydraulic fracturing of subterranean formations which comprises a step for the introduction into the formation at fracturing pressure of a fracturing fluid comprising solid particulate suspended in a fluid dispersion comprising (a) water, (b) a component selected from the group consisting of supercritical carbon dioxide and gaseous nitrogen, carbon dioxide and $C_1$ to $C_3$ hydrocarbons, and mixtures thereof, and (c) one or more polysaccharide surfactants of the formula $RO(R^1O)_x Sacc_z$, wherein R is a monovalent organic radical having a carbon number in the range from about 7 to 24, $R^1$ represents a divalent hydrocarbon radical containing from about 2 to about 4 carbon atoms, x is a number having an average value in the range from 0 to about 12.0, and $Sacc_z$ represents an average number z between about 0.7 and 10.0 of moieties derived from reducing saccharides containing 5 or 6 carbon atoms.

2. The process of claim 1, wherein R in the surfactant formula represents an alkyl or alkylphenyl radical having a carbon number in the range from about 8 to 20, Sacc in the formula represents a glucoside moiety and z has an average value between about 1.0 and 6.0.

3. The process of claim 2, wherein $R^1O$ in the formula represents an oxyethylene radical, and x in the formula is between about 2.5 and 8.0.

4. The process of claim 3, wherein x in the formula is zero.

5. The process of claim 4, wherein R is an alkyl radical having a carbon number in the range from about 9 to 16 and z is a number having an average value of from about 1.3 to 4.0.

6. The process of claim 5, wherein the dispersion contains between about 0.1 and 2 percent by weight of alkyl polysaccharides, calculated on water.

7. The process of claim 6, wherien volume ratio of component (b) to water and surfactant is in the range from about 0.1:1 to 100:1.

8. The process of claim 7, wherein the volume ratio of component (b) to water and surfactant is in the range from about 0.5:1 to 10:1.

9. The process of claim 8, wherein R is an alkyl radical having a carbon number in the range from about 12 to 16 and Sacc is a glucoside moiety.

10. The process of claim 9, wherein the dispersion contains between about 0.25 to 0.75 percent by weight of polysaccharides, calculated on water.

11. The process of claim 8, wherein component (b) is selected from the group consisting of carbon dioxide, nitrogen and mixtures thereof, and Sacc in the formula represents a glucoside moiety.

12. The process of claim 1, wherein the dispersion contains between about 0.1 and 2 percent by weight of polysaccharides, calculated on water.

13. The process of claim 12, wherein volume ratio of component (b) to water and surfactant is in the range from about 0.1:1 to 100:1.

14. The process of claim 1, wherein the solid particulate is suspended in a fluid dispersion consisting essentially of components (a), (b) and (c).

15. The process of claim 14, wherien R in the surfactant formula represents an alkyl radical having a carbon number in the range from about 9 to 16.

16. The process of claim 15, wherein the volume ratio of component (b) to water and surfactant is in the range from about 0.5 to 10.

17. The process of claim 16, wherein x in the formula is zero and z in the formula has an average value between about 1.0 and 6.0.

18. The process of claim 17, wherein the dispersion contains between about 0.1 and 2 percent by weight of polysaccharide, calculated on water.

19. The process of claim 18, wherein Sacc represents a glucoside moiety.

20. The process of claim 19, wherein R is an alkyl radical having a carbon number in the range from about 12 to 16.

21. The process of claim 20, wherein the fluid dispersion consists of components (a), (b) and (c).

22. The process of claim 14, wherein the fluid dispersion consists of components (a), (b) and (c).

* * * * *